US006206549B1

(12) United States Patent
Li

(10) Patent No.: US 6,206,549 B1
(45) Date of Patent: Mar. 27, 2001

(54) LIGHT REFLECTOR

(75) Inventor: Ying Hung Li, Shatin (HK)

(73) Assignee: World Hint Limited, Kowloon (HK)

( * ) Notice: Subject to any disclaimer, the term of this patent is extended or adjusted under 35 U.S.C. 154(b) by 0 days.

(21) Appl. No.: 09/318,575

(22) Filed: May 27, 1999

(51) Int. Cl.[7] ................................ F21V 7/00; B60Q 1/00

(52) U.S. Cl. .......................... 362/297; 362/346; 362/347; 362/348; 362/349; 362/350; 362/518

(58) Field of Search .................................... 362/297, 518, 362/346, 347, 348, 349, 350

(56) References Cited

U.S. PATENT DOCUMENTS

| | | | | |
|---|---|---|---|---|
| 1,408,875 | * | 3/1922 | Foley | 362/297 |
| 1,993,147 | * | 3/1935 | Cathrill | 362/518 |
| 4,277,821 | * | 7/1981 | Sassmannshausen | 362/346 |
| 4,447,865 | * | 5/1984 | VanHorn et al. | 362/297 |
| 4,545,000 | * | 10/1985 | Fraley et al. | 362/297 |
| 4,864,476 | * | 9/1989 | Lemons et al. | 362/297 |
| 4,979,077 | * | 12/1990 | Philipp-Buterowe et al. | 362/346 |
| 4,984,140 | | 1/1991 | Ellion | 362/187 |
| 5,130,902 | * | 7/1992 | Schmid et al. | 362/297 |
| 5,967,647 | * | 10/1999 | Eichler | 362/518 |

FOREIGN PATENT DOCUMENTS

| | | |
|---|---|---|
| 0005080 | 2/1982 | (EP) . |
| 0265396 | 4/1988 | (EP) . |
| 2264164 | 8/1993 | (GB) . |

* cited by examiner

*Primary Examiner*—Sandra O'Shea
*Assistant Examiner*—David V. Hobden
(74) *Attorney, Agent, or Firm*—Leydig, Voit & Mayer, Ltd.

(57) ABSTRACT

A light reflector for use in a lighting device including a light bulb having a filament. The reflector includes a cup-shaped body having a parabolic internal reflective surface divided transversely into an inner portion surrounding the light bulb to focus light from the light bulb into a parallel light beam to produce a bright spot and an outer portion adjoining the inner portion. The outer portion is faceted to smooth blurring around the bright spot.

3 Claims, 1 Drawing Sheet

LIGHT REFLECTOR

The present invention relates to a light reflector for use in a lighting device such as a flashlight or lantern.

BACKGROUND OF THE INVENTION

Conventional flashlights or the like incorporate a light bulb and a cup-shaped parabolic reflector for focusing the light from the light bulb into a parallel light beam. It is found that only the central portion of the reflecting surface of the reflector surrounding the light bulb actually serves to produce the parallel light beam to form a bright spot, with the outer portion producing trail light in random directions. Such trail light is undesirable for blurring unevenly around the bright spot. Cup-shaped reflectors, having their entire reflecting surface faceted, are also known for even illumination, but they do not focus light into a parallel light beam.

The invention seeks to mitigate or to at least alleviate such problems by providing an improved light reflector.

SUMMARY OF THE INVENTION

According to the invention, there is provided a light reflector for use in a lighting device including a light bulb having a filament, which reflector comprises a cup-shaped body having a parabolic internal reflective surface which is divided transversely into an inner portion for surrounding the light bulb to focus light from the light bulb into a parallel light beam for shining to produce a bright spot and an outer portion adjoining the inner portion, said outer portion being faceted to smooth out blurring around the bright spot.

In a preferred embodiment, the inner portion of the reflective surface is arranged to extend axially beyond the filament.

Preferably, the outer portion of the reflective surface is in the form of at least one ring of facets which are packed close together.

It is further preferred that the outer portion of the reflective surface is in the form of a plurality of rings of facets, with the facets between adjacent rings packed close with each other.

It is further preferred that the outer portion of the reflective surface is in the form of a plurality of rings of facets of the same number, with the facets between adjacent rings radially aligned with each other.

Preferably, the outer portion of the reflective surface is faceted to form facets having a shape which is substantially trapezoidal.

Preferably, the outer portion of the reflective surface extends to reach an open rim of the body.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
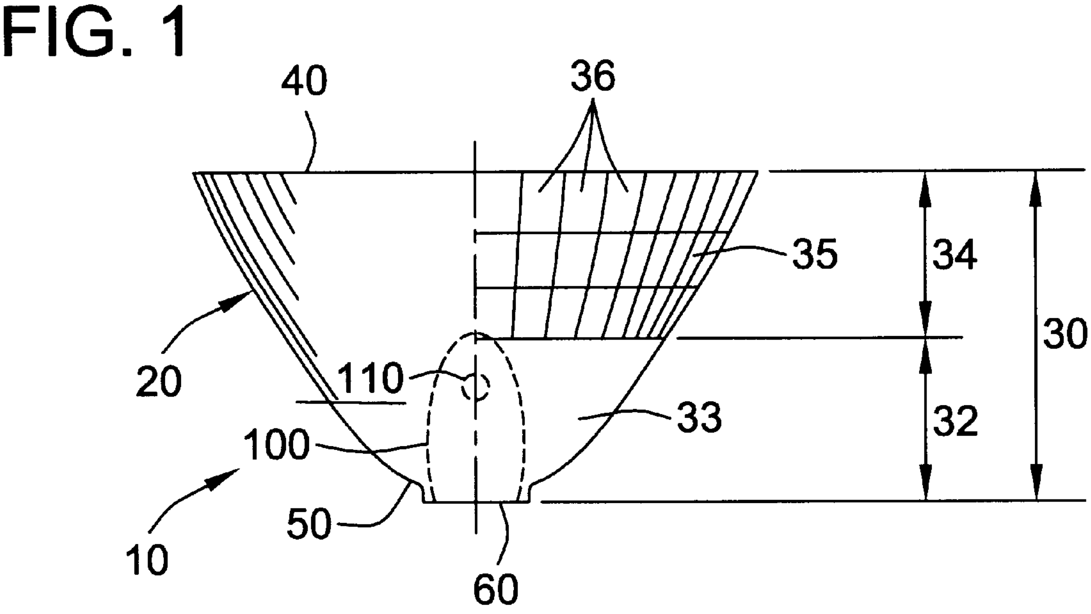
FIG. 1 is a half cross-sectional side view of an embodiment of a light reflector in accordance with the invention.
Figure 2:
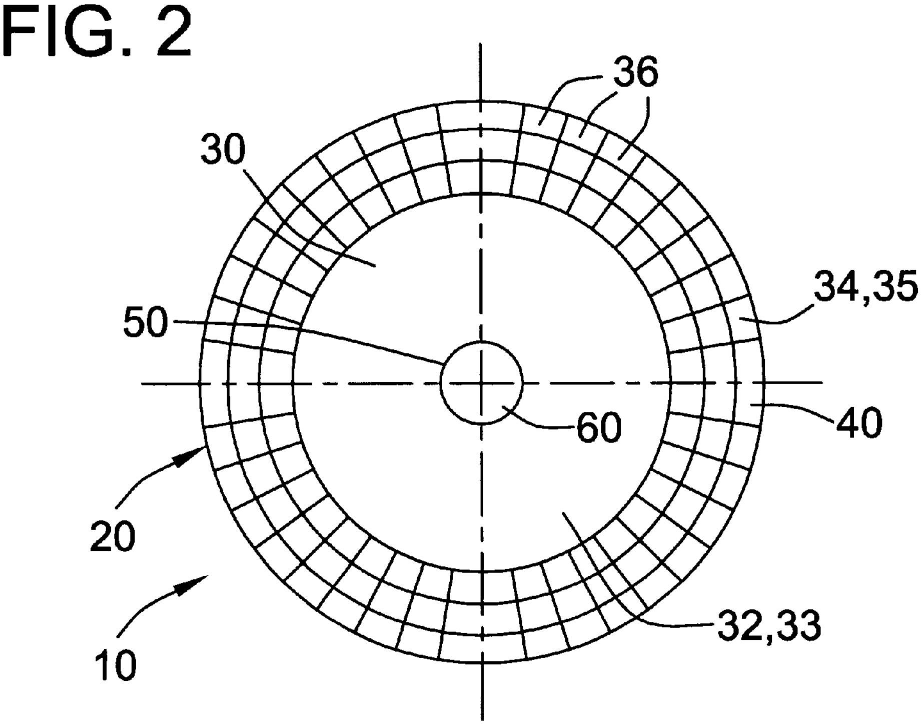
FIG. 2 is a top plan view of the light reflector of FIG. 1.

Referring to the drawings, there is shown a light reflector 10 embodying the invention, for use in a lighting device such as a flashlight or lantern (not shown), which reflector 10 comprises a cup-shaped plastic body 20 having a parabolic internal reflective surface 30. The body 20 has a larger open front end 40 and a smaller rear end 50 which is formed with a central hole 60 for the insertion of a light bulb 100, of the lighting device, forward and co-axially into the body 20.

The entire internal surface 30 of the body 20 is coated with a layer of lustrous aluminum material for light reflection. By reason of the general parabolic shape, the reflective surface 30 will focus the light from the light bulb 100 into a parallel light beam to form a bright spot on an object being illuminated.

The reflective surface 30 is divided transversely into an inner portion 32 surrounding the light bulb 100 and an outer portion 34 adjoining the inner portion 32. The inner portion 32 has a smooth (truly parabolic) reflecting surface 33 and extends outwards from the rear end hole 60 to an axial extent beyond or sufficient to entirely cover a filament 110 of the light bulb 100. The outer portion 34 starts from an axial position beyond the filament 110 to reach the rim at the body's front end 40 and has a faceted (overall parabolic) reflecting surface 35.

The faceted reflecting surface 35 is in the form of three adjoining rings of small planar surfaces or facets 36. There are forty identical facets 36 in each row, The facets are trapezoidal in shape and packed close together and in radial alignment with respective facets 36 of the other two rows.

The sole function of the smooth reflecting surface 33 is to focus the light from the light bulb 100 into a parallel light beam as mentioned above. The faceted reflecting surface 35 serves to perform the same focusing function by reason of its general parabolic shape, as well as to smooth blurring around the bright spot formed by the parallel light beam.

The smoothing of blurring around the bright spot, resulting in the formation of an even but dimmer light ring around the bright spot, is made possible because the facets 36 have specific and organised orientations and thus reflecting angles, which together will render the blurring uniform, independent of the precise shape and/or position of the filament 110.

The invention has been given by way of example only, and various modifications of and/or alterations to the described embodiment may be made by persons skilled in the art without departing from the scope of the invention as specified in the appended claims.

What is claimed is:

1. A light reflector having an internal reflective surface rotationally symmetrical about a central axis, a single parabolic shape in any cross-section including the central axis, a single focus on the central axis, a first opening coaxial with the central axis for insertion of a light bulb with a filament, and a second opening, larger than the first opening, at a rim of the light reflector for escape of light produced by the light bulb and reflected from the internal reflective surface, the internal reflective surface being divided by a plane orthogonal to the central axis into a first portion extending from the first opening to the plane and a second portion extending from the plane to the second opening, the plane being closer to the rim than the filament of the light bulb inserted through the first opening, the first portion having a smooth surface extending from the first opening to the plane, and the second portion having a faceted surface extending from the plane to the second opening, wherein the faceted surface includes coaxial rings of contiguous trapezoidal facets.

2. The light reflector as claimed in claim 1 wherein the coaxial rings are contiguous.

3. The light reflector as claimed in claim 2 wherein each of the rings includes an identical number of trapezoidal facets and the facets of adjacent rings are radially aligned with each other.

* * * * *